(12) United States Patent
Gass et al.

(10) Patent No.: US 8,051,759 B2
(45) Date of Patent: Nov. 8, 2011

(54) MOTION DETECTING SYSTEM FOR USE IN A SAFETY SYSTEM FOR POWER EQUIPMENT

(75) Inventors: Stephen F. Gass, Wilsonville, OR (US); Robert L. Chamberlain, Raleigh, NC (US); J. David Fulmer, Tualatin, OR (US); Joel F. Jensen, Redwood City, CA (US); Benjamin B. Schramm, Los Gatos, CA (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 12/661,766

(22) Filed: Mar. 22, 2010

(65) Prior Publication Data

US 2010/0251866 A1 Oct. 7, 2010

Related U.S. Application Data

(63) Continuation of application No. 11/810,196, filed on Jun. 4, 2007, now Pat. No. 7,681,479, which is a continuation of application No. 09/929,234, filed on Aug. 13, 2001, now Pat. No. 7,225,712.

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B26D 1/14* (2006.01)
*B27B 5/00* (2006.01)

(52) U.S. Cl. ..... 83/62.1; 83/471.3; 83/877.1; 83/DIG. 1

(58) Field of Classification Search ................... 83/62.1, 83/471.3, 477.1, DIG. 1, 478, 76.7, 472, 83/397.1, 398, 932, 971.3, 473, 501, 526, 83/491, 58; 144/427, 391, 356, 384
See application file for complete search history.

(56) References Cited

U.S. PATENT DOCUMENTS 3,371,736 A 3/1968 Lewis et al.
(Continued)

FOREIGN PATENT DOCUMENTS
DE 19609771 6/1998

*Primary Examiner* — Ghassem Alie

(57) ABSTRACT

A method of controlling a woodworking machine having a movable cutting tool. The method monitors a signal for a change indicative of a dangerous condition between the cutting tool and a person, senses movement of the cutting tool, and performs an action to mitigate the dangerous condition when the signal change and movement of the cutting tool are both detected. A woodworking machine including a detection system adapted to detect a dangerous condition between a person and a working portion of the machine and then to perform some action to mitigate the dangerous condition is also disclosed. A motion detection system is adapted to detect motion of the working portion and to disable the reaction system when the working portion is not moving.

17 Claims, 6 Drawing Sheets

U.S. PATENT DOCUMENTS

| | | |
|---|---|---|
| 3,783,709 A | 1/1974 | Scott |
| 3,785,230 A | 1/1974 | Lokey |
| 3,805,639 A | 4/1974 | Peter |
| 3,805,658 A | 4/1974 | Scott et al. |
| 3,840,851 A | 10/1974 | Fowler et al. |
| 3,858,095 A | 12/1974 | Friemann et al. |
| 3,889,567 A | 6/1975 | Sato et al. |
| 4,029,159 A | 6/1977 | Nymann |
| 4,048,886 A | 9/1977 | Zettler |
| 4,117,752 A * | 10/1978 | Yoneda .............................. 83/58 |
| 4,453,112 A | 6/1984 | Sauer et al. |
| 4,557,168 A | 12/1985 | Tokiwa |
| 4,644,832 A | 2/1987 | Smith |
| 4,653,189 A | 3/1987 | Andreasson |
| 5,094,000 A | 3/1992 | Becht et al. |
| 5,572,916 A | 11/1996 | Takano |
| 5,989,116 A | 11/1999 | Johnson et al. |
| 5,992,276 A | 11/1999 | Sullivan |
| 6,167,324 A * | 12/2000 | Gorman ......................... 700/171 |
| 6,170,373 B1 * | 1/2001 | Sasaki et al. .................... 83/485 |

* cited by examiner

MOTION DETECTING SYSTEM FOR USE IN A SAFETY SYSTEM FOR POWER EQUIPMENT

CROSS-REFERENCE TO RELATED APPLICATIONS

This application is a continuation of U.S. patent application Ser. No. 11/810,196, filed Jun. 4, 2007, issuing as U.S. Pat. No. 7,681,479 on Mar. 23, 2010, which in turn is a continuation of U.S. patent application Ser. No. 09/929,234, filed Aug. 13, 2001, issued as U.S. Pat. No. 7,225,712 on Jun. 5, 2007, which claims the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000. The identified patent and applications are all incorporated by reference in their entireties.

FIELD

The present invention relates to safety systems, and more particularly to a high-speed safety system for use on power equipment.

BACKGROUND

Beginning with the industrial revolution and continuing to the present, mechanized equipment has allowed workers to produce goods with greater speed and less effort than possible with manually-powered tools. Unfortunately, the power and high operating speeds of mechanized equipment creates a risk for those operating such machinery. Each year thousands of people are maimed or killed by accidents involving power equipment.

As might be expected, many systems have been developed to minimize the risk of injury when using power equipment. Probably the most common safety feature is a guard that physically blocks an operator from making contact with dangerous components of machinery, such as belts, shafts or blades. In many cases, guards are effective to reduce the risk of injury, however, there are many instances where the nature of the operations to be performed precludes using a guard that completely blocks access to hazardous machine parts.

Various systems have been proposed to prevent accidental injury where guards cannot effectively be employed. For instance, U.S. Pat. Nos. 941,726, 2,978,084, 3,011,610, 3,047,116, 4,195,722 and 4,321,841, the disclosures of which are incorporated herein by reference, all disclose safety systems for use with power presses. These systems utilize cables attached to the wrists of the operator that either pull back a user's hands from the work zone upon operation or prevent operation until the user's hands are outside the danger zone. U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine.

U.S. Pat. Nos. 4,959,909, 5,025,175, 5,122,091, 5,198,702, 5,201,684, 5,272,946, and 5,510,685 disclose safety systems for use with meat-skinning equipment, and are incorporated herein by reference. These systems interrupt or reverse power to the motor, or disengage a clutch, upon contact with a user's hand by any dangerous portion of the machine. Typically, contact between the user and the machine is detected by monitoring for electrical contact between a fine wire mesh in a glove worn by the user and some metal component in the dangerous area of the machine.

U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid. U.S. Pat. No. 4,117,752, which is herein incorporated by reference, discloses a similar braking system for use with a band saw, where the brake is triggered by actual contact between the user's hand and the blade.

It is often necessary for an equipment operator to touch the blade or other cutting device of power equipment when the blade or device is not moving (e.g., to adjust the blade, perform equipment maintenance, etc.). Thus, it would be desirable to disable the safety system when the blade is not moving since there is no danger to the user from contact with the blade.

DETAILED DESCRIPTION

Figure 1:
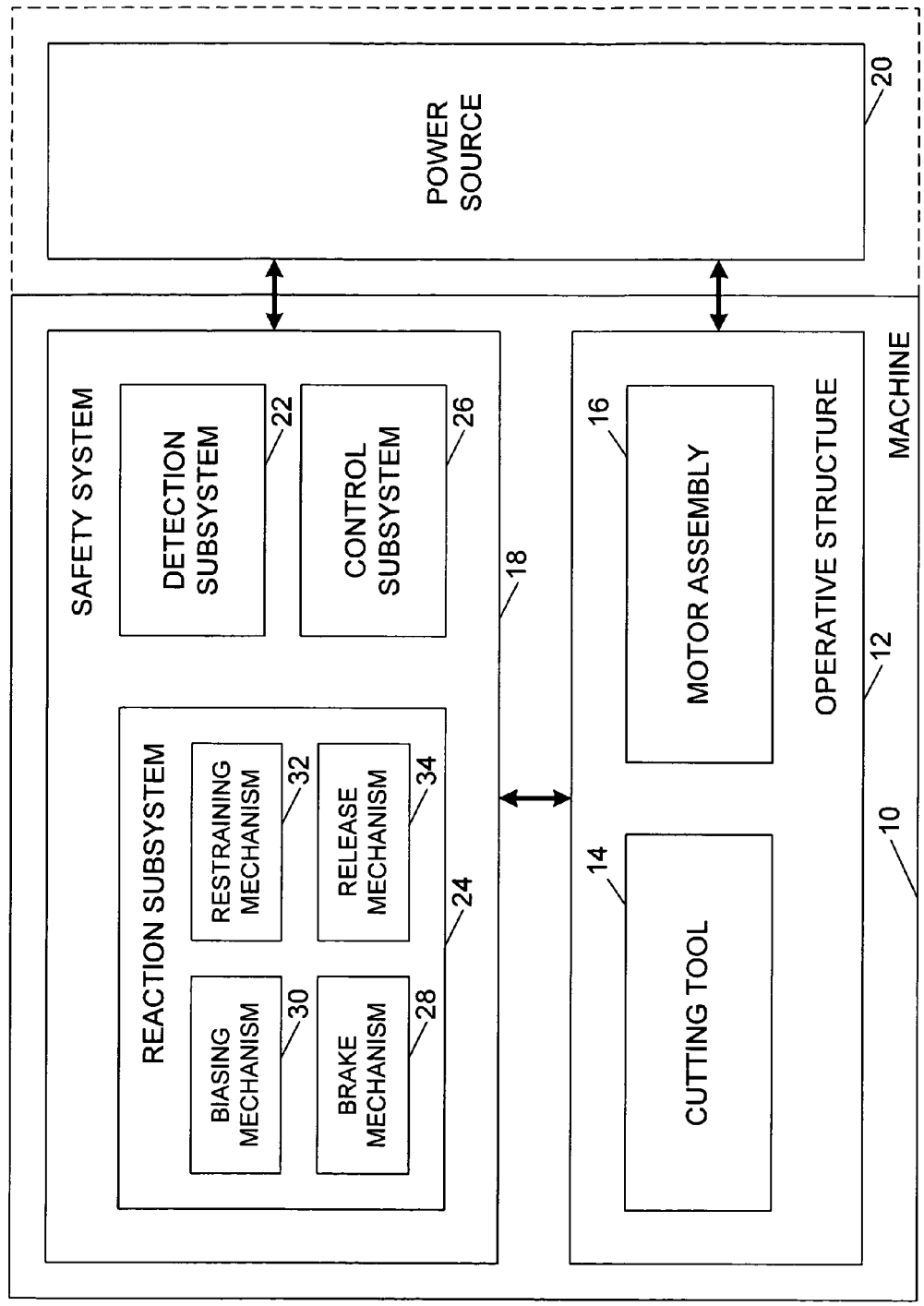
FIG. 1 is a schematic block diagram of a machine with a fast-acting safety system according to the present invention.

A machine is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
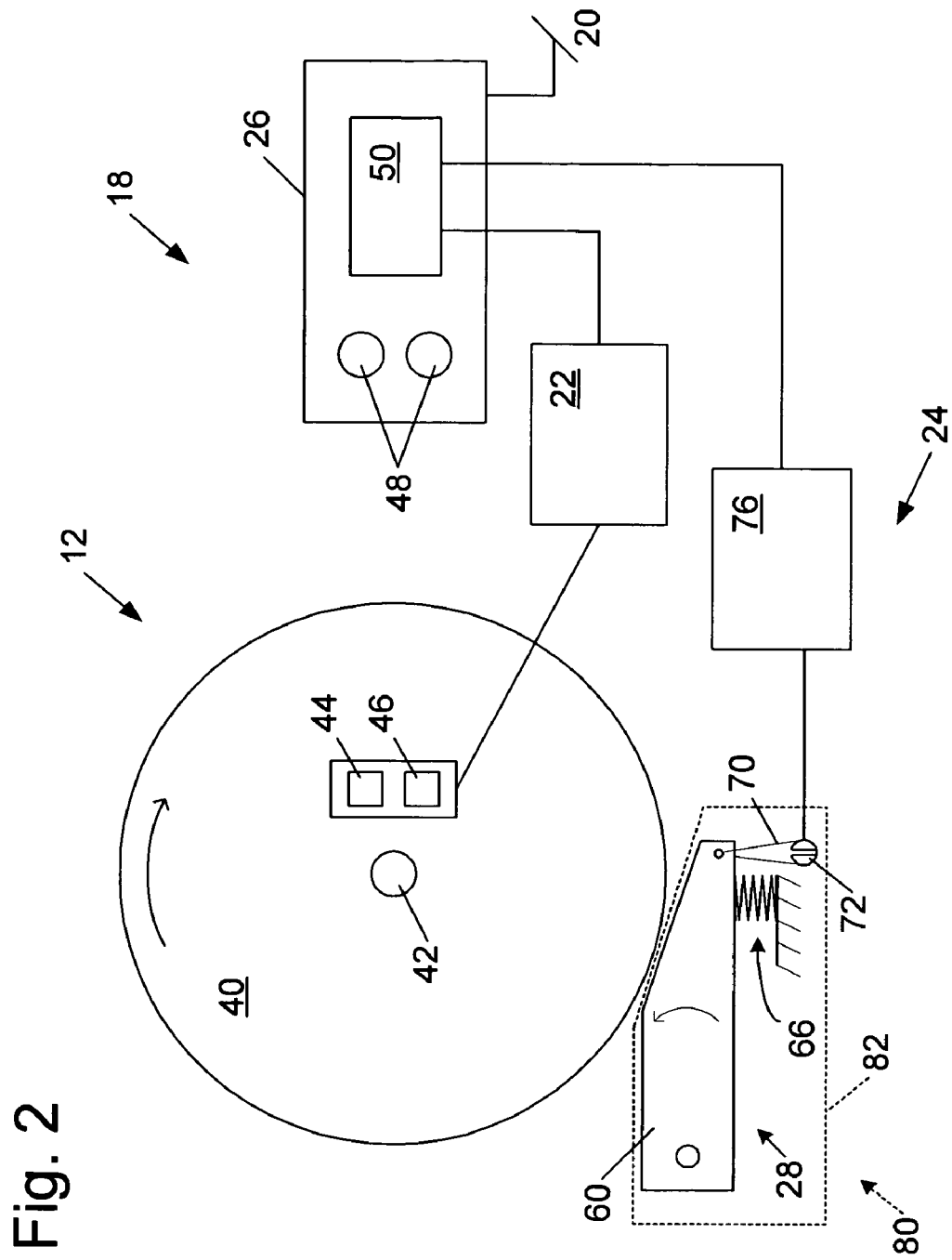
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC, the disclosure of which is herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC, U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. No. 60/182,866, filed Feb. 16, 2000 and U.S. Provisional Patent Application Ser. No. 60/157,340, filed Oct. 1, 1999, the disclosures of which are herein incorporated by reference.

As mentioned above, safety system 18 may include a sensor or sensor assembly for detecting motion of the blade or cutting tool. The sensor assembly typically is coupled to send a signal to logic controller 50 indicating whether the blade is in motion. The logic controller may be configured to respond differently to the detection of a dangerous condition based on whether the blade is moving. For example, it is often necessary for a user of machine 10 to touch blade 40 when preparing the machine for use, and when installing or removing the blade. Usually, the user would disconnect all power from machine 10 while performing such operations. However, in the event that the user neglects to disconnect the machine from power source 20 before touching the blade, logic controller 50 would receive a contact detection signal from detection subsystem 22. If safety system 18 includes a blade motion sensor, then logic controller 50 may be configured not to actuate firing subsystem 76 when the blade is not moving. Instead, the logic controller may be configured to take one or more other actions such as disabling motor assembly 16, sounding an alarm, displaying an error, etc. Alternatively, the logic controller may be configured to take no action if contact is detected while the blade is not moving.

In addition to detecting whether the blade is moving, safety system 18 may also be configured to determine the speed at which the blade is moving. This allows the logic controller to distinguish between rapid blade movement which could cause injury to the user, and slow blade movement which generally would not cause injury to the user. Thus, for example, a user could move the blade by hand without actuating firing subsystem 76. In some embodiments, the blade motion sensor may be configured to determine relative blade speed. In alternative embodiments, logic controller 50 may be configured to analyze the signal from the blade motion sensor to determine relative blade speed.

It will be appreciated that the speed at which a blade is considered likely to cause injury will vary depending on the type of machine 10 and blade 40. For example, a 14-inch carbide tooth blade on a table saw will cause serious injury at a lower speed than a 5⅜-inch plywood blade on a cordless trim saw. Thus, an embodiment of safety system 18 for use on the table saw may be configured to actuate the firing subsystem only at blade speeds above approximately 10, 25, 60, or 90 rpm, while an alternative embodiment of safety system 18 for use on the trim saw may be configured to actuate the firing subsystem only at blade speeds above approximately 40, 100, or 240 rpm.

Alternatively or additionally, the logic controller may be configured to interpret blade motion as being dangerous only when detected during or soon after motor assembly 16 was in operation. In other words, the blade motion detection would only be active while the blade was being moved by the motor assembly and during a relatively brief period afterward while the blade was coasting to a stop. Any blade motion detected at other times would be ignored.

Safety system 18 may include any of a wide variety of sensor assemblies to detect blade movement. Furthermore, each sensor assembly may be adapted as necessary depending on the particular type of blade 40 and/or the configuration of machine 10. While several exemplary sensor assemblies are described herein, it will be understood that all methods and mechanisms suitable for automatically detecting the motion of a blade are within the scope of the invention.

Figure 3:
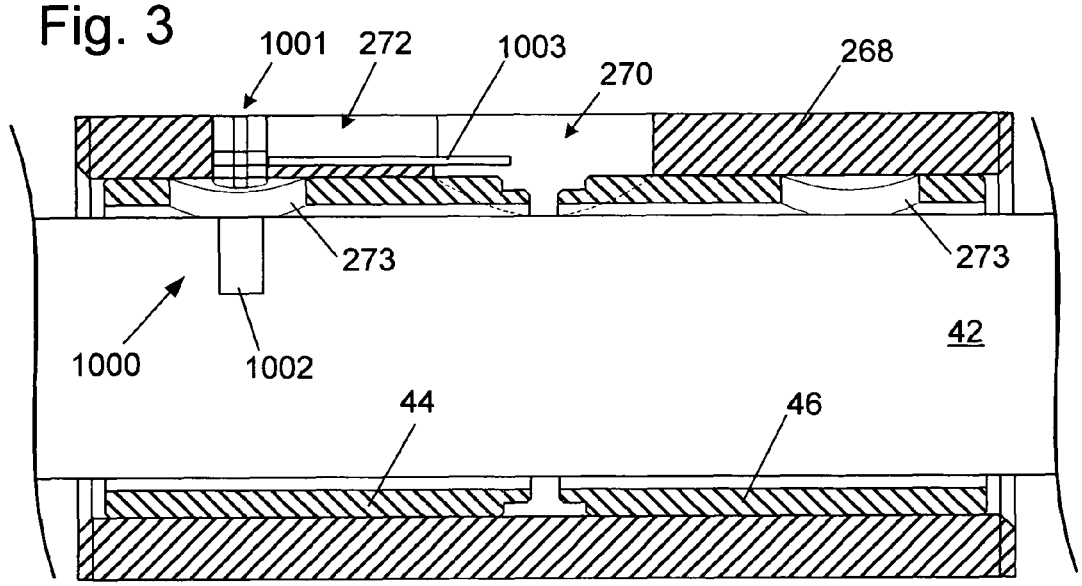
FIG. 3 is a partial cross-section view of an exemplary magnetic sensor, assembly according to the present invention, where the arbor is not in cross-sectional view.

One exemplary embodiment of safety system 18 includes a magnetic sensor assembly 1000 configured to detect movement of the blade. It will be appreciated that the blade movement may be detected by monitoring the blade or any other portion of the safety system that moves with the blade, including the arbor, bearings, motor assembly, arbor pulley, etc. In the exemplary implementation depicted in FIG. 3, magnetic sensor assembly 1000 includes a Hall effect sensor 1001 and one or more magnets 1002. A coil could also be used to detect magnetic field fluctuations from rotation. The magnets are mounted on arbor 42. Sensor 1001 is mounted and configured to detect blade motion by detecting the movement of the magnets on the arbor. Sensor 1001 may be any suitable Hall effect sensor such as, for example, the sensor available from Micronas Intermetall of San Jose, Calif., under the part no. HAL 114.

Hall effect sensor 1001 may be mounted adjacent the arbor by any suitable method. In the exemplary implementation, the sensor is mounted in a recessed region 272 of an insulating tube 268. The insulating tube also supports charge plates 44 and 46, as is described in more detail in U.S. Provisional Application Ser. No. 60/225,211, entitled "Apparatus and Method for Detecting Dangerous Conditions in Power Equipment," filed Aug. 14, 2000, by SD3, LLC. The recessed region is disposed at least partially over a hole 273 in charge plate 44. Alternatively the recessed region may be disposed over a hole 273 in charge plate 46. In any event, magnet 1002 is disposed on arbor 42 to pass beneath or adjacent hole 273 as the arbor rotates within the insulating tube. Hole 273 allows sensor 1001 to detect the field created by magnet 1002 as it passes. Sensor 1001 includes one or more connector leads 1003 connectable to receive power from, and transmit signals to, logic controller 50.

Magnets 1002 may be mounted on the arbor in any suitable fashion. Typically, the magnets are mounted so as not to extend above the surface of the arbor. For example, the magnets may be press-fit and/or glued in a recess formed on the arbor. Alternatively, one or more of the magnets may be mounted to extend above the surface of the arbor. The size and number of magnets 1002 may be varied to control the signal produced by sensor 1001. In alternative embodiments, magnets 1002 may be mounted at other locations such as an end of arbor 42, on blade 40, etc.

Figure 4:
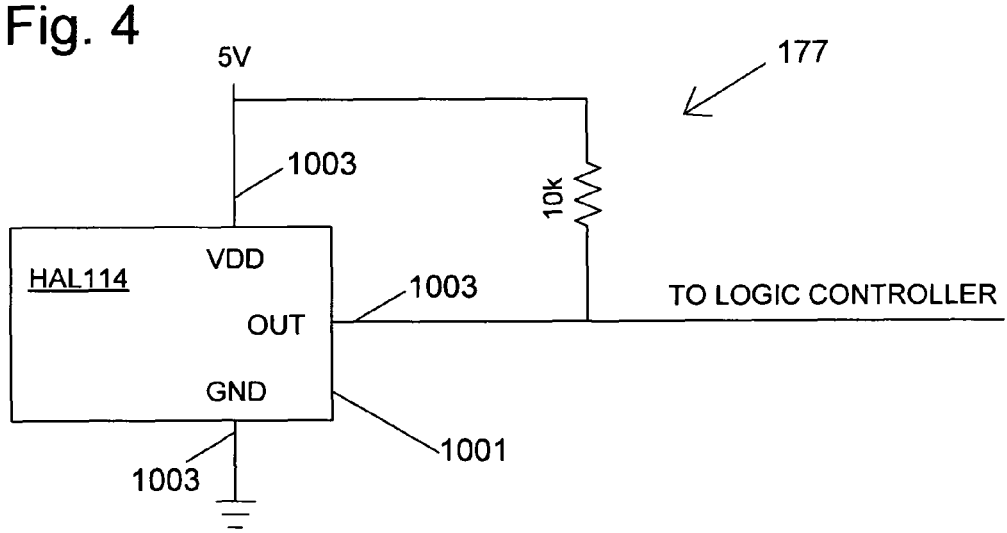
FIG. 4 is a schematic diagram of an exemplary circuit according to the present invention for use with a magnetic sensor assembly.

Sensor 1001 may be connected to send signals to logic controller 50 via any suitable circuitry. For example, FIG. 4 illustrates one exemplary rotation sense circuit 177 adapted to couple the signals from sensor 1001 to logic controller 50. Those of skill in the art will appreciate that circuit 177 may be modified as needed for a particular application.

Another example of a suitable method for detecting blade motion is through electromagnetic field (EMF) measurements. As is known to those of skill in the art, when power to an electric motor is shut off, the motor will produce EMF pulses on the input power cables as the motor spins down. Thus, where blade 40 is driven by an electric motor assembly 16, the blade may be assumed to be in motion whenever an EMF pulse is detected on the power supply cables, as well as whenever power is being supplied to the motor assembly.

Figure 5:
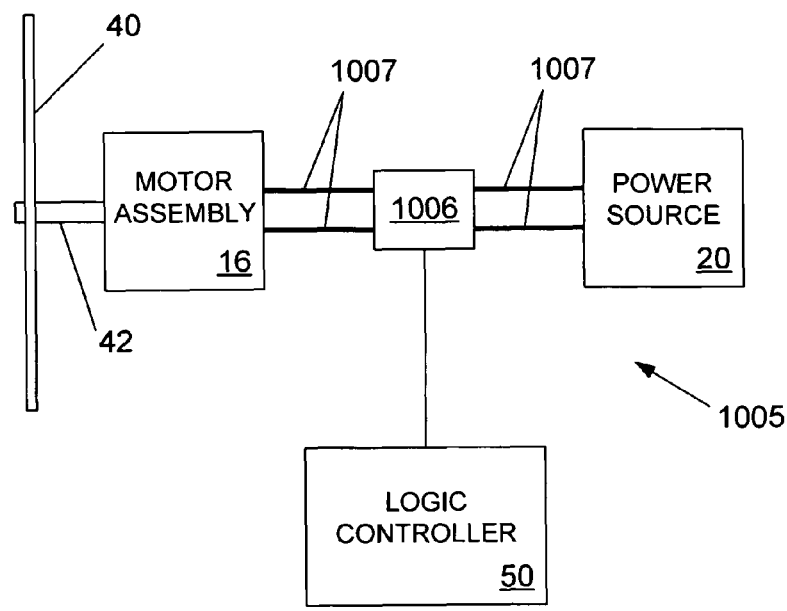
FIG. 5 is a schematic view of an exemplary EMF sensor assembly according to the present invention.

Thus, in another exemplary embodiment depicted in FIG. 5, safety system 18 includes an EMF sensor assembly 1005 configured to detect motion of blade 40. Sensor assembly 1005 includes an EMF detection circuit 1006 disposed in the power supply path between motor assembly 16 and power source 20. Circuit 1006 is adapted to monitor power cables 1007 which extend between the power source and the motor assembly, and to detect the presence of EMF pulses on the cables. Alternatively, circuit 1006 may be disposed at any other location suitable for detecting EMF pulses from motor assembly 16. Circuit 1006 may be any circuit or mechanism adapted to detect EMF pulses, such as are known to those of skill in the art. Circuit 1006 is also coupled to logic controller 50, and adapted to convey a signal to the logic controller indicating the presence and/or absence of EMF pulses on cables 1007. Optionally, circuit 1006 and/or logic controller 50 may be adapted to analyze the detected EMF emissions, and evaluate the speed of blade 40. In such case, the logic controller may be configured not to actuate firing subsystem 76 when the speed of the blade is unlikely to cause serious injury to the user.

In another exemplary embodiment, safety system 18 includes an optical sensor assembly adapted to optically detect movement of blade 40. Safety system 18 may be configured to optically detect blade motion in a variety of ways. For example, a rotary optical encoder may be coupled to the arbor to detect rotation of the arbor. Any rotary encoder may be used, such as those available from Omron Electronics Inc., of Schaumburg, Ill. Alternatively, other optical sensor assemblies may be used as described below.

Typically, the optical sensor assembly will be at least partially enclosed to prevent saw dust or other debris from interfering with the detection. One exemplary implementation of an optical sensor assembly is indicated generally at 1010 in FIG. 6. Sensor assembly 1010 includes an optical detector 1011 adapted to detect light from an optical source 1012. Alternatively, plural optical sources and/or plural optical detectors may be used. It will be appreciated that any of a variety of different optical sources may be used which are known to those of skill in the art, including an incandescent or fluorescent bulb, light emitting diode (LED), laser diode, etc. Similarly, any of a variety of different optical detectors may be used which are known to those of skill in the art, including a photodiode, phototransistor, etc.

In any event, the optical source is arranged so that the signal received at the optical detector when the blade is moving is different than the signal received when the blade is stationary. For example, the source and detector may be arranged so that a signal is received only when the blade is moving, or only when the blade is stationary. Alternatively, source 1012 and detector 1011 may be arranged so that the amount of emitted light that reaches the detector varies when the blade is in motion.

Figure 6:
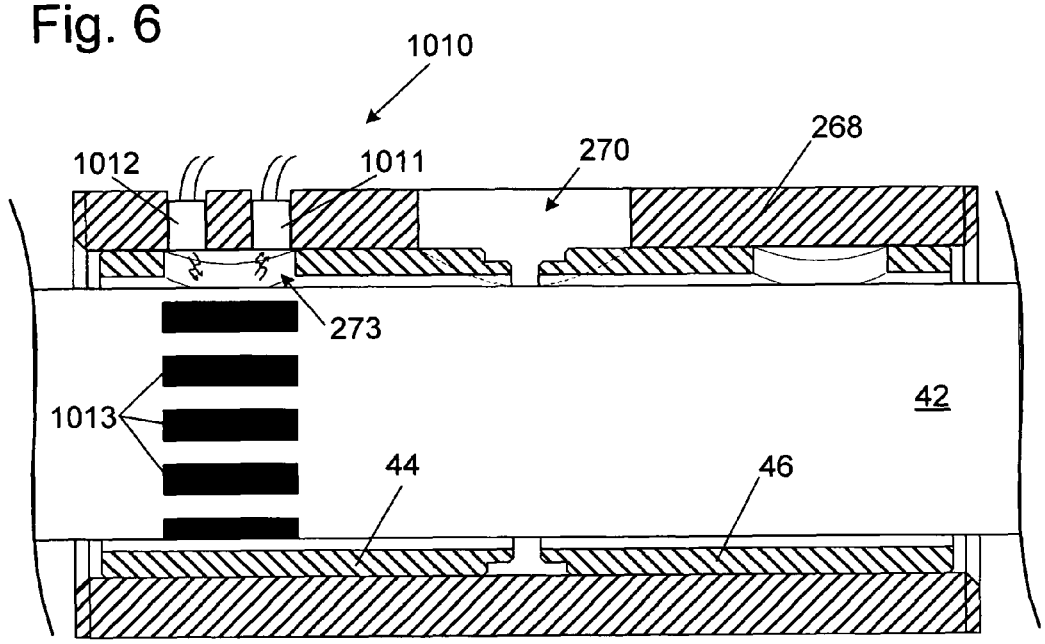
FIG. 6 is a partial cross-section view of an exemplary optical sensor assembly according to the present invention, where the arbor is not in cross-sectional view.

The implementation depicted in FIG. 6 uses this latter arrangement. Sensor assembly 1010 includes an LED 1012 mounted in insulating tube 268 to emit light through hole 273 in charge plate 44 or 46. The light reflects off arbor 42 and is detected by a photodiode 1011 which is also mounted in insulating tube 268 adjacent hole 273. The arbor includes one or more reduced-reflection regions 1013 adapted to reduce the amount of light reflected to photodiode 1011. Regions 1013 may be formed by coating the arbor with a light-absorbing coating, roughening the arbor to cause random scattering of the light, etc. In any event, the reduced reflecting regions create a varying signal at the photodiode when the arbor is rotating. In contrast, a constant signal is produced at the photodiode when the arbor is stationary.

The minimal clearance between arbor 42 and charge plates 44, 46 tends to maintain the space between the arbor and the photodiode/LED relatively free of debris which could block the signal. Alternatively, the insulating tube assembly may be sealed in a protective housing (not shown).

Figure 7:
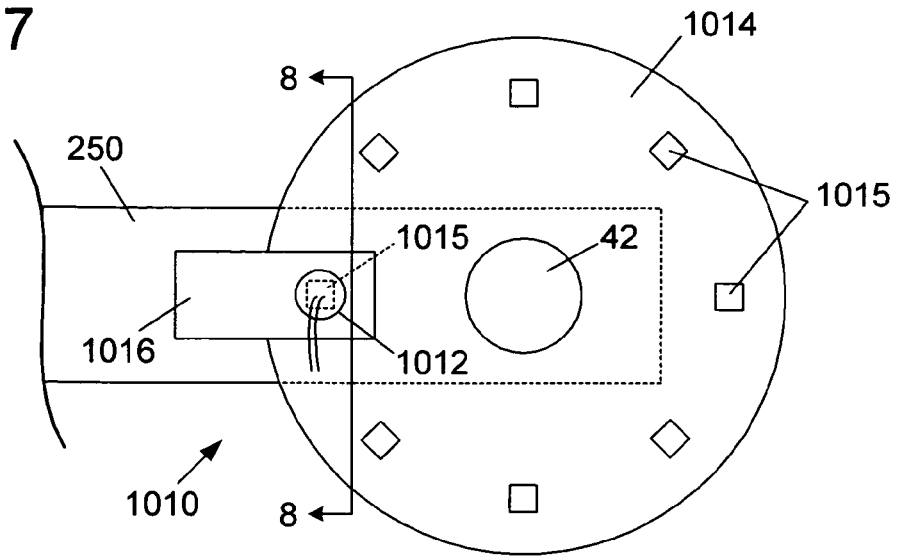
FIG. 7 is a side elevation of an alternative optical sensor assembly according to the present invention.
Figure 8:
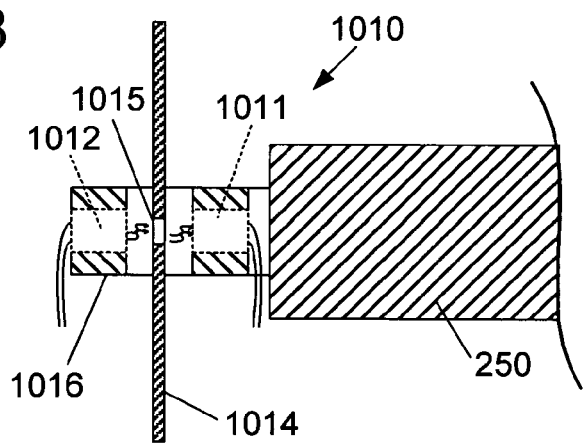
FIG. 8 is a cross-section view of the alternative optical sensor assembly of FIG. 7, taken generally along the line 8-8.

In another alternative implementation depicted in FIGS. 7 and 8, optical sensor assembly 1010 includes a barrier member 1014 mounted on the arbor and disposed between photodiode 1011 and LED 1012. Alternatively, the barrier member may be mounted on any other portion of cutting tool 14 or motor assembly 16 adapted to move with the blade. Barrier member 1014 includes one or more light-transmitting regions or holes 1015, which may take any desired shape or size. The photodiode and LED are mounted in a support member 1016 attached to an arbor block 250, and disposed on either side of barrier member 1014. The photodiode is aligned so that emitted light will pass through holes 1015. Likewise, the LED is aligned to detect the light which passes through the holes. Thus, as arbor 42 rotates, light from the LED is alternately blocked and transmitted by the barrier member, thereby creating a varying signal at the photodiode.

Figure 9:
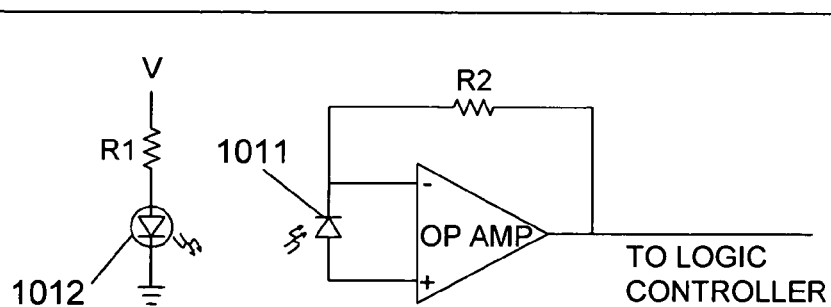
FIG. 9. is a schematic diagram of an exemplary circuit according to the present invention for use with an optical sensor assembly.

Photodiode 1011 and LED 1012 may be connected to any suitable driving circuitry such as are known to those of skill in the art. FIG. 9 shows one exemplary circuitry for producing an optical signal at LED 1012 and detecting the signal at photodiode 1011. The particular values of the circuit components and voltage supplies may be selected as desired for a specific application. In any event, the photodiode is coupled to transmit a signal to logic controller 50 to indicate whether blade 40 is moving.

In another exemplary embodiment, safety system 18 includes an electrical sensor assembly adapted to electrically detect movement of blade 40. There are numerous methods and mechanisms for electrically detecting blade movement within the scope of the invention. The particular method and/or mechanism selected will typically depend on the specific type and configuration of machine 10. For example, where charge plate 46 is configured to capacitively detect a signal induced in the blade, any incidental eccentricity in the blade or the blade rotation will cause the capacitance between the blade and charge plate 46 to vary as the blade rotates. As a result, charge plate 46 will detect a varying signal amplitude when the blade is rotating. Thus, a single sensor may be configured to detect both contact with the user and rotation of the blade. Preferably, the incidental variation fluctuation is insufficient in magnitude and/or rate of change to trigger reaction subsystem 24.

Figure 10:
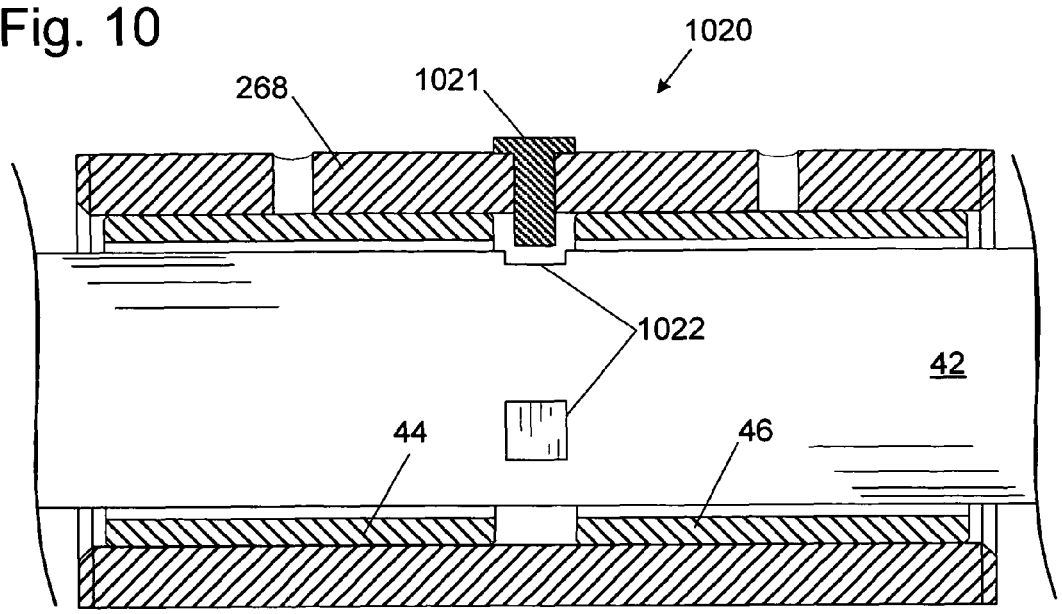
FIG. 10 is a partial cross-section view of an exemplary electrical sensor assembly according to the present invention, where the arbor is not in cross-sectional view.

Rather than rely on incidental eccentricities, safety system 18 may include an exemplary electrical sensor assembly adapted to detect a signal variation caused by a designed eccentricity or non-uniformity in the blade. Alternatively, the sensor assembly may be adapted to detect the signal from an eccentricity in some portion of cutting tool 14 that moves with the blade and is electrically coupled to the blade. One exemplary implementation of such a sensor assembly is indicated generally at 1020 in FIG. 10. Sensor assembly 1020 includes a detection electrode 1021 capacitively coupled to detect an electrical signal on arbor 42. Electrode 1021 may be mounted in any suitable fashion to provide electrical insulation from arbor 42 as well as the remainder of cutting tool 14 and machine 10. In the exemplary implementation, electrode 1021 is mounted in insulating tube 268 and arranged to extend to a point closely adjacent the arbor between charge plates 44 and 46. Sensor assembly 1020 also includes one or more eccentricities 1022 disposed on the arbor and substantially aligned with electrode 1021 so as to pass by the electrode as the arbor rotates.

It will be appreciated that eccentricities 1022 may be configured in any desired quantity, size, shape or form adapted to cause a variation in the capacitance between the arbor and the electrode as the arbor rotates. In the exemplary implementation, eccentricities 1022 take the form of beveled regions formed on the surface of arbor 42. Thus, the space between the electrode and the arbor is greater (and therefore the capacitance is less) when an eccentricity is positioned beneath the electrode than when an eccentricity is not positioned beneath the electrode. Alternatively, eccentricities 1022 may take other forms adapted to vary the capacitance between the arbor and electrode, including raised regions, dielectric pads, etc. In any event, if an electrical signal is induced in the arbor (e.g., by charge plate 44 of contact detection subsystem 22), then electrode 1021 will detect variations in that signal if the arbor is rotating. Conversely, the electrode will detect no variations in the signal if the arbor is stationary.

Figure 11:
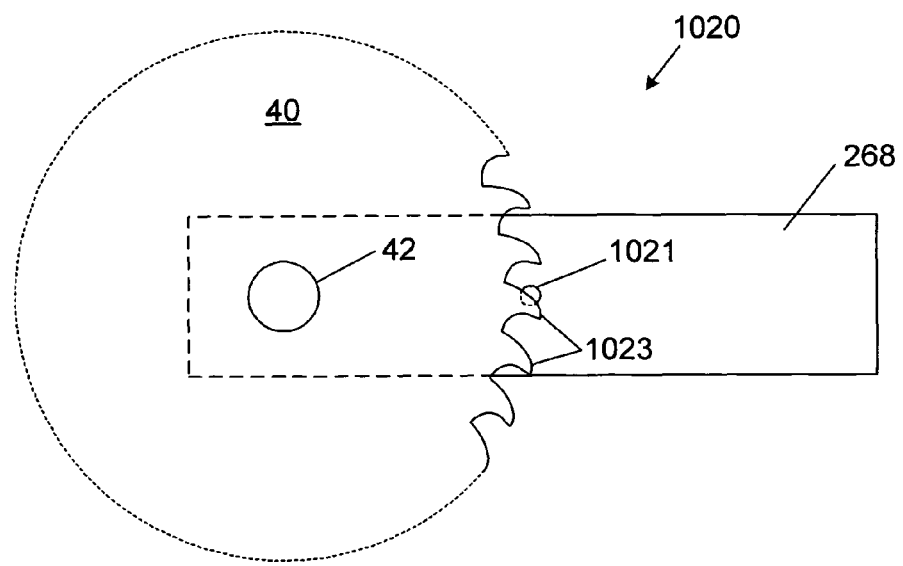
FIG. 11 is a schematic side elevation of an alternative electrical sensor assembly according to the present invention.

Turning attention now to FIG. 11, another exemplary implementation of electrical sensor assembly 1020 is shown in which electrode 1021 is disposed adjacent the teeth 1023 of blade 40. Electrode 1021 may be mounted on arbor block 250 or any other suitable portion of machine 10. Additionally, the electrode may be positioned at the side of the blade (as shown in FIG. 11) or at the perimeter of the blade facing in toward the arbor. The size, shape and position of the electrode may vary depending on the position and size of teeth 1023. In any event, as teeth 1023 pass by electrode 1021, the capacitance between the blade and the electrode varies, thereby varying the amplitude of the signal detected by the electrode. Alternatively, a plurality of electrodes may be positioned at various points adjacent the teeth so that blade motion would be detected by modulations in the relative signal amplitudes at the electrodes. Such an alternative detection mechanism may also be used with other implementations of sensor assembly 1020.

While a few exemplary magnetic, EMF, optical and electrical sensor assemblies have been described for detecting blade motion, it will be appreciated that many modifications and variations to such sensor assemblies are included within the scope of the invention. Furthermore, safety system 18 may include other types of motion detection sensors such as mechanical sensors, sonic and ultra-sonic sensors, etc. In any event, the invention provides effective and reliable means for discriminating between conditions which are, and are not, likely to cause injury to a user of power machinery.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A method of controlling a woodworking machine having a movable cutting tool, the method comprising:
   imparting an electric signal to a predetermined portion of the machine;
   monitoring the electric signal for at least one change indicative of a dangerous condition between the cutting tool and a person;
   sensing movement of the cutting tool; and
   performing a predetermined action to mitigate the dangerous condition when the change in the electric signal and movement of the cutting tool are both detected.

2. The method of claim 1, where the predetermined portion of the machine is the cutting tool.

3. The method of claim 1, where the predetermined action is stopping the motion of the cutting tool.

4. The method of claim 1, where the predetermined action is retracting the cutting tool.

5. The method of claim 1, where the woodworking machine includes a motor to move the cutting tool, and where the predetermined action is disconnecting the motor from power.

6. The method of claim 1, where the predetermined action is placing a barrier adjacent the cutting tool.

7. The method of claim 1, where the dangerous condition is contact with the cutting tool.

8. The method of claim 1, where the dangerous condition is proximity to the cutting tool.

9. The method of claim 1, where the woodworking machine includes a rotatable arbor, where the cutting tool is mounted on the arbor, and where movement of the cutting tool is sensed by sensing rotation of the arbor.

10. The method of claim 1, where movement of the cutting tool is not sensed if the cutting tool is moving below a threshold speed.

11. The method of claim 1, where the woodworking machine is a table saw and the cutting tool is a circular blade.

12. The method of claim 1, where sensing movement of the cutting tool includes application of data to an algorithm.

13. The method of claim 12, where the application of data to an algorithm is done by a signal processor.

14. The method of claim 1, where movement of the cutting tool is sensed through an electrical signal.

15. The method of claim 1, where movement of the cutting tool is sensed through an optical signal.

16. The method of claim 1, where movement of the cutting tool is sensed through an electromagnetic field sensor.

17. A method of controlling a woodworking machine having a movable cutting tool, the method comprising:
   imparting an electric signal to a predetermined portion of the machine;
   monitoring the electric signal for at least one change indicative of a dangerous condition between the cutting tool and a person;
   a step for sensing movement of the cutting tool; and
   mitigating the dangerous condition when the change in the electric signal and movement of the cutting tool are both detected.

* * * * *